United States Patent [19]

Lazzari

[11] 4,184,631

[45] Jan. 22, 1980

[54] DEVICE FOR READING INFORMATION MAGNETICALLY CODED ON A CARRIER

[75] Inventor: Jean-Pierre Lazzari, Montfort l'Amaury, France

[73] Assignee: Compagnie Internationale pour l'Informatique CII-Honeywell Bull, Paris, France

[21] Appl. No.: 899,217

[22] Filed: Apr. 24, 1978

[30] Foreign Application Priority Data

May 13, 1977 [FR] France ............................... 77 14661

[51] Int. Cl.$^2$ ........................ G06K 7/08; G11B 5/12; G11B 5/20
[52] U.S. Cl. ................................. 235/449; 360/113; 360/124
[58] Field of Search ................... 340/146.3 C, 149 A, 340/152 R; 360/113, 124, 111; 365/158; 235/449, 450

[56] References Cited

U.S. PATENT DOCUMENTS

| | | | |
|---|---|---|---|
| 3,509,535 | 4/1970 | Berube | 235/449 |
| 3,796,859 | 3/1974 | Thompson | 235/61.11 D |
| 3,848,217 | 11/1974 | Lazzari | 360/111 |
| 3,945,038 | 3/1976 | Lazzari | 360/113 |
| 3,959,824 | 5/1976 | Ohi | 360/124 |
| 3,969,769 | 7/1976 | Gorter | 360/113 |
| 4,008,493 | 2/1977 | Pizzuto | 360/124 |
| 4,038,596 | 7/1977 | Lee | 340/149 A |
| 4,040,113 | 8/1977 | Gorter | 360/113 |
| 4,072,994 | 2/1978 | Takashima | 360/124 |
| 4,087,789 | 5/1978 | Beery | 340/146.3 C |

FOREIGN PATENT DOCUMENTS

2269168 4/1975 France .

OTHER PUBLICATIONS

Hagopian, "Magneto-Resistive Type Hand-Scanning Magnetic Transducer", IBM Tech. Disc. Bull., vol. 14, No. 8, pp. 2488-2489, Jan. 1972.

Bate, McGuire & Shelledy, "Magneto-Resistive Read Heads", IBM Tech. Discl. Bull., vol. 17, No. 4, pp. 967-968, Sep. 1974.

*Primary Examiner*—Robert M. Kilgore
*Attorney, Agent, or Firm*—Cameron, Kerkam, Sutton, Stowell & Stowell

[57] ABSTRACT

There is provided a reader for reading information magnetically coded on a carrier. The reader includes a magnetizing device for magnetizing the information precoded on the carrier and a transducer for detecting the magnetized information as the carrier is translated successively past the magnetizer and transducer. The magnetizer includes at least one magnetic layer having a succession of adjoining zones, the length of alternate zones being much greater than the length of the other zones and the magnetic induction in the zones being of opposite sense. The transducer includes at least one magneto-resistive detecting member and a magneto-resistive compensating member which are of anisotropic magnetic material. The members are disposed to develop across the compensating member a voltage in response to the interference magnetic field which is equal to that developed across the detecting member due to that field. However, the compensating element is positioned so as to be outside of the magnetic leakage field of the coded information. The leakage field of the magnetizing device is utilized to polarize the magnetic-resistive members by causing their axes of easy magnetization to rotate through an angle $\theta$ between 0° and 90° and preferably 45°.

17 Claims, 7 Drawing Figures

FIG:1
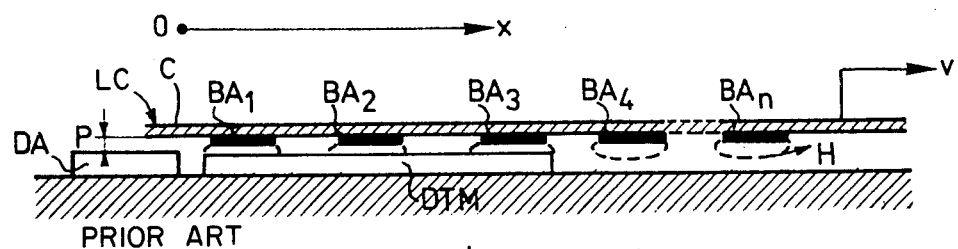
PRIOR ART
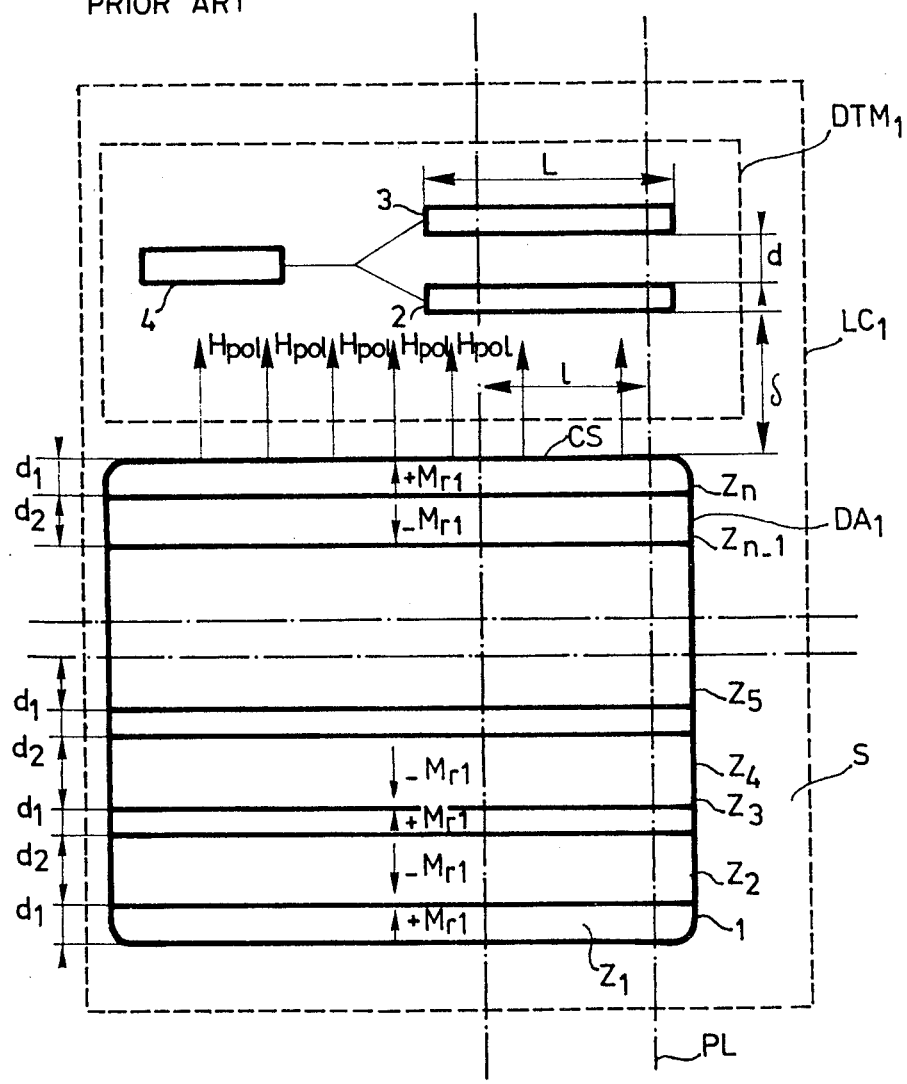
FIG:2

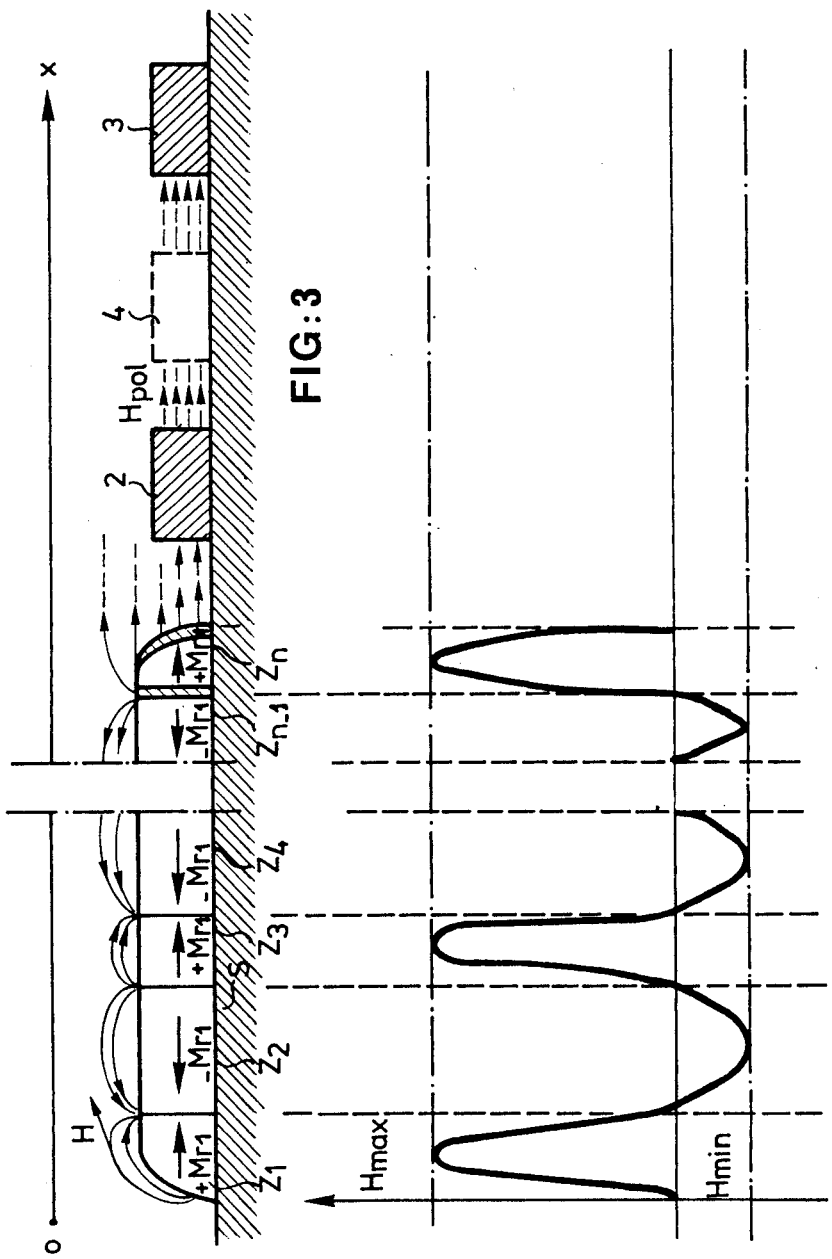

DEVICE FOR READING INFORMATION MAGNETICALLY CODED ON A CARRIER

BACKGROUND OF THE INVENTION

1. Field of the Invention

The present invention relates to a device for reading magnetic information. It is applicable in particular to apparatus for reading checks.

2. Description of the Prior Art

It is known that present-day data processing systems frequently include data infeed arrangements which are called "readers" which employ slips carrying coded magnetic information. These slips are for example, bank checks, post-office checks, withdrawal slips, deposit slips, credit cards, or the like.

The information concerned generally consists of a series of alpha-numeric characters printed on the slips, that is to say a succession of letters of the alphabet, figures, punctuation marks, etc. which indicate, in the case where the slip is a check for example, the number of the check or the account number of the drawer.

Each character is formed by a set of bars composed of magnetic ink. The number of bars, the distance between the bars, and their relative disposition are individual to each character and are coded in accordance with known codes such as, for example, the CMC 7 code.

The check reader converts the coded magnetic information represented by the characters printed on the check into a succession of electrical signals of constant amplitude and variable length. These signals are transmitted to electronic shaping circuits where they are converted into a series of square-wave electrical pulses of constant width and amplitude. These pulses are in turn transmitted to electronic circuits for recognizing the characters printed on the check. As soon as the characters corresponding to the series of electrical pulses have been identified, it is possible to cause a calculating unit in the data-processing system with which the check reader is associated to perform operations relating to the check such as debiting, crediting and updating the account.

So that the subject of the invention may be better understood, a brief review of some facts relating to magnetism will be given.

To magnetize a magnetic material in which the magnetic induction is low, the material is first subjected to a positive magnetic field whose strength is sufficient to saturate the material, that is to say for the magnetic induction in the material to reach a limiting value Bs. The external magnetic field is then removed. There then remains in the material a magnetic induction (+Mr) termed the residual induction which is other than zero and which is characteristic of the material. The B/H ratio is termed the initial magnetic permeability of the material when H approaches zero.

If a negative magnetic field is applied to this magnetized material, the magnetic induction in the material becomes zero at a value of H which is termed the coercive field Hc.

In the immediate vicinity of its surface, a magnetized magnetic material creates a magnetic leakage field which is a function of the coercive field Hc and which is theoretically equal at most to this coercive field. In practice the leakage field is always less than the coercive field.

A material which is magnetically anisotropic has two preferred directions of magnetization which are perpendicular to one another. One of these is termed the direction of easy magnetization, while the other is termed the direction of hard magnetization. The initial permeability of the material in the direction of hard magnetization is much higher than the permeability of the material in the direction of easy magnetization. What is termed the anisotropy field Hk is that value of the magnetic field H applied to the material at which the material is saturated in its direction of hard magnetization.

The magnetic flux $\phi$ of a magnetic field H through an area S is equal to the product of the strength of the field and the size of the area.

Check readers generally include a magnetizing device to magnetize the bars forming the printed characters on the check in order to render the value and sense of magnetic induction identical in all the bars. Such magnetization is necessary because when the characters are printed on the check, either the induction in the bars is zero or else the value and sense of the magnetic induction in all the bars varies from one bar to the next. Thus, the magnetic induction in the bars is equal to the residual induction of their magnetic ink when they are no longer subject to the magnetizing field of the magnetizing device. Check readers also include generally a magnetic transducer device which is sensitive to the magnetic leakage field generated by the bars after they have been magnetized by the magnetizing device. The transducer device emits in response to this field, an electrical signal which is transmitted to the aforementioned electronic shaping circuits. Thus, the magnetic transducer device enables the presence of bars to be detected.

The check is moved by a mechanical transporting device and is positioned in the device in such a way that all the bars initially pass in front of the magnetizing device and then the magnetic transducer device, in succession, and in close proximity thereto. The mechanical device is driven either manually or by an electric motor.

Simple and inexpensive magnetizing devices are known which are extremely effective in saturating the bars. Such a device is described, for example, in U.S. application Ser. No. 880,331, filed in the name of Jean-Pierre Lazzari and Michel Helle on Feb. 23, 1978, and entitled "A Localized-Field Static Magnetizing Device." Said application is assigned to the assignee of the subject application and the subject matter thereof is incorporated herein by reference. Such a device consists of a magnetic layer preferably having a high coercive field which is deposited on a preferably insulating substrate, the layer containing a succession of adjoining zones which are of different alternating lengths d1 & d2, one of which is very much greater than the other, and whose magnetic inductions are of opposed senses and are generally equal in value to the residual induction of the magnetic layer. Such magnetizing devices have a high magnetic leakage field which is very much confined to the vicinity of the surface and to the edges of the magnetic layer.

Also known are simple and inexpensive transducer devices which are highly reliable in detecting the presence of bars, while at the same time being insensitive to their speed of movement. Such magnetic transducer devices generally employ magneto-resistors.

It will be recalled that magneto-resistors are electrical resistors which are deposited on a substrate of insulating material in the form of thin layers or films of very small thickness (from a few hundred angstroms to a few microns in thickness) and whose resistance varies when they are subjected to a magnetic field. A measuring magneto-resistor R of this kind is connected to the terminals of a generator which outputs a current I. When a bar passes in front of the magneto-resistor, the flux of the magnetic leakage field H of the bar causes a change $\Delta R$ in its resistance and thus a change in voltage $\Delta V = I \Delta R$ at its terminals, $\Delta R/R$ being termed the coefficient of magneto-resistance. U.S. application Ser. No. 899,383, corresponding to French patent application No. 77.13026 entitled "Magnetic Transducer Device For Detecting Coded Magnetic Information And Method Of Manufacturing The Said Device" which was filed in France by the applicant's present assignee on Apr. 29th 1977, discloses a magnetic transducer device which contains at least one magneto-resistive member for detecting the presence of bars and a magneto-resistive compensating member which is arranged close to the magneto-resistive detecting member in such a way that it is not subject to the magnetic leakage field of the bars, but is subject to the same interference magnetic fields as the detecting member. Said U.S. application Ser. No. 899,383, corresponding to French application 77.13026, was filed in the United States in the name of Jean-Pierre Lazzari and Michel Helle on Apr. 29, 1977 and is assigned to the assignee of the subject application, the subject matter of said application is hereby incorporated herein by reference.

What are termed interference magnetic fields are magnetic and electromagnetic fields other than the magnetic leakage field H of the bars, such as the magnetic fields which are generated by any nearby electrical apparatus and the magnetic field of the earth.

SUMMARY OF THE INVENTION

The present invention enables the advantages of the magnetizing and magnetic transducer devices described in the patent applications mentioned above to be combined, by arranging the devices close to one another and preferably on the same substrate.

In this way there is produced a compact device for reading magnetic information, which is inexpensive and of very small size and which reads with extreme accuracy.

In accordance with the present invention, there is provided a device for reading magnetic information which consists of a magnetizing device to magnetize the information to be read and a magnetic transducer device to detect the said information. The said information is caused to pass successively in front of the magnetizing device and the magnetic transducer device. The magnetizing device has at least one magnetic layer consisting of a succession of adjoining zones whose lengths $d_1$ and $d_2$ are such that $d_2$ is much greater than $d_1$. The magnetic inductions in these zones are of opposite sense. The magnetic transducer device consists of at least one magneto-resistive member for detecting the information and a magneto-resistive compensating member which is arranged close to the magneto-resistive detecting member at a distance such that it is sensitive to the same interference fields as the detecting member, while not being sensitive to the magnetic field of the information, with the voltages of the electrical output signals emitted by the detecting and compensating members subject to the effect of the interference magnetic fields being equal.

In a preferred embodiment of the invention, the material constituting the magneto-resistive detecting and compensating members is an anisotropic material whose axis of easy magnetization is perpendicular to the magnetic leakage field of the said information.

In a particularly advantageous embodiment of the invention, the magnetizing device is arranged in such a way that its edge closest to the magnetic transducer device is at a distance from the magneto-resistive detecting and compensating members such that the latter are subject, along their axes of hard magnetization, to the magnetic leakage field of the said magnetizing device, which causes their axes of easy magnetization to rotate through an angle $\theta$ which is preferably close to 45°. The magneto-resistive members are said to be "polarized" and it can be shown, as described in French Pat. No. 2 165 206, entitled "Improved Magneto-Resistors And Electromagnetic Transducers Incorporating Them" and the corresponding U.S. Pat. No. 3,848,217 and a continuation-in-part thereof, U.S. Pat. No. 3,945,038, the subject matter of which is incorporated by reference, that the sensitivity of the magneto-resistors, and thus the voltage of their output signals is improved in this way, the change $\Delta R$ in their resistance then being a maximum for a given change. $\Delta H$ in the magnetic field to which they are subject along their axis of hard magnetization.

BRIEF DESCRIPTION OF THE DRAWINGS

Other features and advantages of the invention will become apparent from the following description, which is given by way of non-limiting example, and by reference to the figures of the accompanying drawings.

In the figures:

FIG. 1 shows the relative positions of a bar of magnetic ink carried on a check and of a check reader, as is known in the prior art.

FIG. 2 is a view from above showing an embodiment of a check reader according to the invention.

FIG. 3 is a sectional view of the check reader of FIG. 2 taken at the region of the magneto-resistive bar-detecting members which belong to the magnetic transducer device of the reader.

FIG. 4 is a curve for the distribution of the magnetic leakage field of the magnetizing device belonging to the check reader when projected on to an axis parallel to the surface of the said magnetizing device.

DESCRIPTION OF THE PREFERRED EMBODIMENTS

Figure 5:
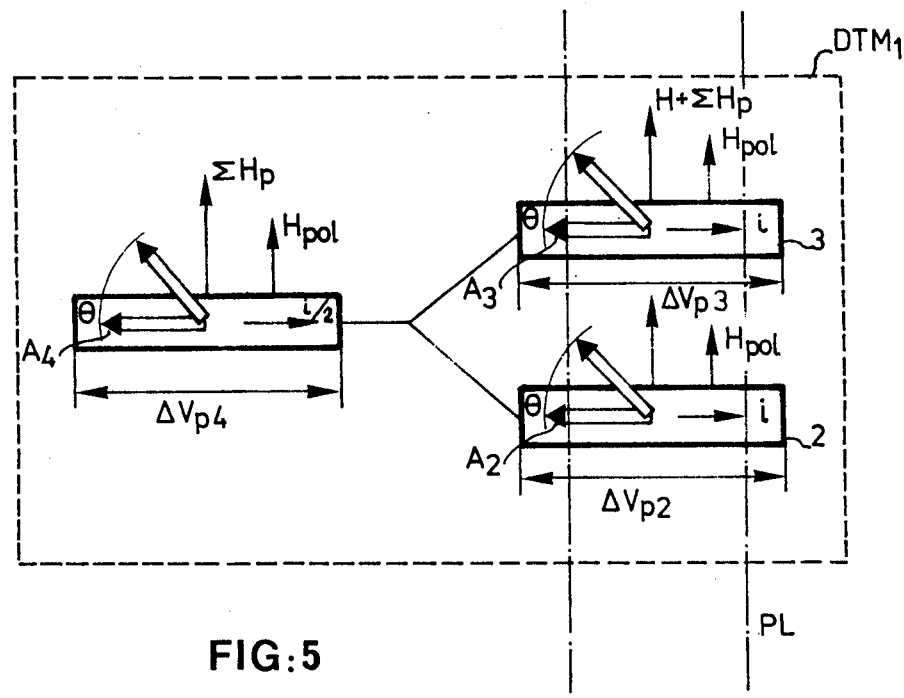
FIG. 5 is a view from above showing a magneto-resistive magnetic transducer device formed from anisotropic magnetic material.

In FIG. 1 there is shown in cross-section, a slip C, such as a bank check, which moves along an axis $\overline{O}x$ at a speed $v$ (from left to right in FIG. 1) above a check reader LC. The slip C is transported by a well known mechanical device (manual or otherwise) which is not shown in FIG. 1. The slip C carries bars of magnetic ink $BA_1, BA_2, BA_3, BA_4 \ldots BA_n$ which are deposited thereon and which define the characters printed on the check.

The check reader LC includes a magnetizing device DA and a magnetic transducer device DTM which are each symbolized by a rectangle in FIG. 1. The magnetizing device DA magnetizes the bars before they pass in front of the magnetic transducer device DTM which operates to detect their presence. The path followed by the characters when they move across the front of the check reader LC defines a reading track PL of width l, as shown in FIG. 2.

Referring to FIGS. 2 and 3, it can be seen that the magnetizing device $DA_1$ of the check reader $LC_1$ according to the invention has a magnetic layer 1, which preferably has a high coercive field and which is arranged on a substrate S. Substrate S is preferably made of insulating material. The magnetic layer 1 contains a succession of zones $Z_1, Z_2, Z_3, Z_4 \ldots Z_n$, in which the magnetic induction is alternately positive and negative, the sign of the induction being fixed in a random fashion.

The length of the odd zones $Z_3, Z_5, Z_i \ldots Z_n$ in the axial direction of the track PL is constant and equal to $d_i$, while the length of the even zones $Z_2$, along the same direction is equal to $d_2$, the length $d_2$ being very much greater than $d_1$. It will be assumed that the induction is positive in the odd zones and equal to the residual induction ($+Mrl$) of the magnetic material of which the layer 1 is formed and that the induction is negative in the even zones and equal to ($-Mrl$). A fuller description of the magnetizing device $DA_1$ may be found in the French patent Application No. 77.09823 mentioned above, or its corresponding U.S. application Ser. No. 880,331.

Layer 1, which is divided into successive zones $Z_1 \ldots Z_n$, produces in the vicinity of its surface a magnetostatic leakage field H. The main lines of force at leakage field H are shown in FIG. 3, and the distribution along the axis $\vec{Ox}$, parallel to the surface of the layer 1, of the modulus of the projection $\vec{Hx}$ of the field $\vec{H}$ on this axis is shown in FIG. 4. It can be see that the modulus varies between a maximum value Hmax above the odd zones and a minimum value Hmin above the even zones, it being arbitrarily assumed that field $\vec{Hx}$ is positive above the first zones and negative above the second zones.

When the bars $BA_1 \ldots BA_n$ on the slip C pass successively above the zones $Z_1, Z_2, Z_3 \ldots Z_n$, they receive a succession of pulses of the magnetic field Hmax so that when they pass above the last zone $Z_n$ they are practically saturated. After passing above layer 1, the magnetic induction in the bars becomes equal to Mr2, which is the intrinsic residual induction of the magnetic material forming the bars.

A preferred embodiment of the magnetic transducer device $DTM_1$ of the check reader $LC_1$ according to the invention is shown in FIGS. 2, 3 and 5. It includes two magneto-resistive members 2 and 3 for detecting the presence of bars. Members 2 and 3 are preferably identical and spaced apart from one another. There is also provided a magneto-resistive compensating member 4 of the same material as members 2 and 3 and of the same width and thickness, and coefficient of magneto-resistance. However, the length of member 4 is half that of members 2 and 3, which means that its resistance is also half. Members 2, 3 and 4 have a length much greater than their width and are arranged parallel to each other, with their axes transverse to the longitudinal axis of track PL.

The compensating member 4 is arranged near members 2 and 3, but outside the reading track PL. The members 2, 3 and 4 are preferably arranged on the same substrate S as the magnetizing device $DA_1$ and transducer $DTM_1$ but it will be apparent to those having ordinary skill in the art that devices $DA_1$ and $DTM_1$ may be arranged on different substrates and this arrangement comes within the spirit and scope of the invention.

It should also be apparent that the magnetic transducer device $DTM_1$ may include any number of magneto-resistive detecting members, while having only a single magneto-resistive compensating member which is common to all of these as described, for example, in the aforementioned French application No. 7709823 or its corresponding U.S. application Ser. No. 880,331.

The members 2, 3, 4 are advantageously connected in parallel to the terminals of the same electrical current generator (not shown in FIGS. 2, 3 and 5). Because of this, if member 4 carries a current I, the current is split equally between members 2 and 3 which carry a current i/2, these currents flowing in the lengthwise direction of members 2, 3 and 4.

When the bars $BA_1 \ldots BA_n$ pass in front of the transducer device $DTM_1$, members 2 and 3 are subjected both to the magnetic leakage field H of the bars, which is perpendicular to their major dimension (length L), and to the interference magnetic fields $\Sigma Hp$ external to the field H, whereas the compensating member is not subject to the leakage field H, but is subject to the same interference magnetic fields $\Sigma Hp$.

A fuller description of the magnetic transducer device $DTM_1$ is given in French patent application No. 77.13026 mentioned above and its corresponding U.S. application Ser. No. 889,383.

Referring to FIG. 5, it can be shown that the voltages $\Delta V_{p2}$, $\Delta V_{p3}$, $\Delta V_{p4}$, which appear at the terminals of magneto-resistive members 2, 3 and 4 respectively in response to the interference fields $\Sigma Hp$ acting on the members are substantially equal and that it is merely necessary to feed the voltages $\Delta V_{p4}$ and $\Delta V_{p2}$ on the one hand, and $\Delta V_{p4}$ and $\Delta V_{p3}$ on the other hand to the inputs of two differential amplifiers to obtain at the outputs of the latter detection voltages $\Delta V_{S2}$, $\Delta V_{S3}$ for the bars. In this manner, any noise signals due to the effect of the interference magnetic signals are eliminated from the detection voltages $\Delta V_{S2}$ and $\Delta V_{S3}$.

In a particularly advantageous embodiment of the invention, the members 2, 3 and 4 are formed from an anisotropic material such as an iron/nickel alloy (18% iron, 82% nickel).

As shown in FIG. 5, the axes $A_2$, $A_3$, $A_4$ of easy magnetization of members 2, 3, 4 are parallel to the length of the members and to the direction of the current I which flows in them. Their axes of hard magnetization are perpendicular to this major dimension and parallel to the magnetic leakage field H of the bars.

Figure 6:
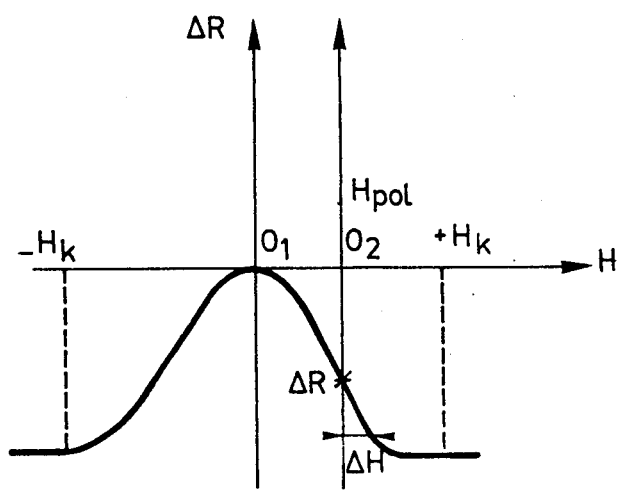
FIG. 6 is a curve for the change in the resistance of a magneto-resistor made of anisotropic magnetic material as a function of the magnetic field which is applied to it in the direction of its axis of hard magnetization.

FIG. 6 shows a curve for the variation R in the resistance R of a magneto-resistor of anisotropic magnetic material, as a function of the magnetic field H which is applied to in parallel to its axis of hard magnetization.

It can be seen that at a value of H equal to the anisotropy field $H_k$ of the material forming the magneto-resistor, at which the material is saturated in the direction of hard magnetization, there is no further change in the resistance R.

As is shown and described in the forementioned French patent No. 2165206, it is possible to endow the magneto-resistor with maximum sensitivity by shifting the ordinate-axis in FIG. 6 from the origin $O_1$ to an origin $O_2$. This is done by subjecting the magneto-resistor to a polarizing field Hpol in the direction of hard magnetization of the magneto-resistor. Thus, a relatively small change $\Delta H$ in the magnetic field applied to the magneto-resistor results in a relatively large change $\Delta R$ in its resistance. It can then be shown that its axis of easy magnetization forms an angle $\theta$ with the direction of the current I, which angle is preferably made equal to 45°.

In a particular embodiment of the invention, the magnetizing device $DA_1$ is arranged in such a way that its side CS (shown in FIG. 2) closest to the magnetic transducer device $DTM_1$ is at a distance $\delta$ from the magneto-resistive member 2 (FIG. 2) such that the leakage field of the magnetizing device $DA_1$ polarizes the magneto-resistors 2, 3, 4 in such a way that their axis of easy magnetization $A_1$, $A_2$, $A_3$ are turned through approximately 45° with respect to the direction of the current which flows through them (see FIG. 5). That is, the leakage field of $DA_1$ equals Hpol. The leakage or polarizing field Hpol needs only to be of the order of a few oersteds to polarize the members 2, 3, and 4 as indicated above.

The distances $\delta$ and d are such that the gradient of the magnetic polarizing field Hpol between members 2 and 4, members 2 and 3, and members 4 and 3 is very small, the maximum change in the field Hpol being of the order of 5% between members 2 and 3. By way of example, distance $\delta$ is between 1 and 10 mm and distance d is close to 0.5 mm.

Figure 7:
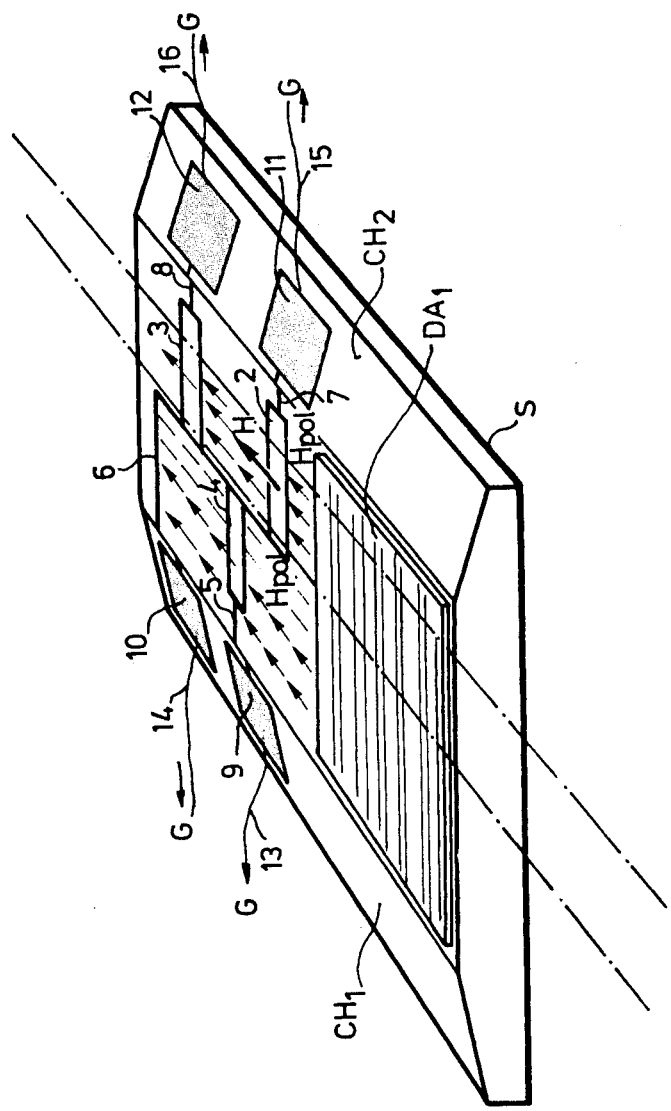
FIG. 7 is a three-quarter perspective view showing the check reader and the electrical connections for the magnetic transducer device in accordance with the present invention.

FIG. 7 is a three-quarter prespective view showing the relative positions of the magnetizing device $DA_1$ and the magnetic transducer device $DTM_1$ on their common substrate S. Substrate S has two bevels $CH_1$ and $CH_2$, on which contact pads are located. The magneto-resistive member 4 is connected to the current generator G (not shown for the sake of simplicity) via conductors 5 and 6 which are deposited on the substrate S and which terminate in large contact pads 9 and 10, and by flexible wires 13 and 14 which are soldered to pads 9 and 10, respectively.

The magneto-resistive member 2 is connected to the generator G by conductors 5 and 7 which terminate at large contact pads 10 and 11, respectively, and by flexible wires 14 and 15 which are soldered to respective ones on the terminal pads 10 and 11. The magneto-resistive member 3 is connected to the current generator G by conductors 6 and 8. Conductor S terminates in a large contact pad 12 to which a flexible conductor 16 is soldered.

The large contact pads 9, 10 and 11, 12 are arranged on respective ones of the bevels $CH_1$ and $CH_2$ as shown in FIG. 7.

While a particular advantageous embodiment of the invention has been illustrated and described, it will be apparent to those having ordinary skill in the art to which the invention pertains that modifications thereto may readily be made without departing from the true spirit of the invention. Accordingly, it is not intended by the foregoing description to limit the invention and resort should be made to the appended claims to determine the full scope of the invention.

I claim:

1. A device for reading information magnetically coded on a carrier having precoded information and adapted to be passed successively in front of a magnetizing device for magnetizing the information and a magnetic transducer device for detecting the magnetized information, comprising:

a magnetizing device having at least one magnetic layer said magnetic layer containing a succession of adjoining zones of lengths $d_1$ and $d_2$, the length $d_2$ being much greater than $d_1$ and the magnetic inductions in the zones being of opposite sense;

a magnetic transducer device having at least one magneto-resistive member for detecting the information and a magneto-resistive compensating member, said compensating member being disposed close to the magneto-resistive detecting member at a distance such that it is subject to the same interference fields as the detecting member while not being subject to the magnetic leakage field of the magnetized information as it passes in front of the transducer, and the voltages developed across the detecting and compensating members in response to the effect of the interference fields being substantially equal.

2. A device according to claim 1 wherein the magneto-resistive detecting and compensating members are formed from an anisotropic magnetic material.

3. A device according to claims 1 or 2 wherein the magnetizing device is arranged in such a way that its edge closest to the said magneto-resistive members is at a distance of $\delta$ from the latter such that its leakage field Hpol polarizes the magneto-resistive members by causing their axes of easy magnetization to rotate through an angle $\theta$ of between 0 and 90°.

4. A device according to claim 3, wherein the angle $\theta$ is close to 45°.

5. A device according to claim 3, characterized in that the distance $\delta$ is between 1 and 10 mm.

6. A device according to claims 1 or 2 wherein the magnetizing and magnetic transducer devices are arranged on the same insulating substrate.

7. A device according to claims 1 or 2 wherein the magnetic layer has a high coercive field.

8. A device according to claims 1 or 2 wherein the magnetic induction in the shorter zones is positive and is equal to the residual induction of the magnetic layer.

9. A device according to claims 1 or 2 wherein the magnetic induction in the longer zones is negative and equal to the residual induction of the magnetic layer.

10. A device according to claims 1 or 2 where the detecting and compensating members have the same co-efficient of magneto-resistance.

11. A device according to claim 10 containing n identical magneto-resistive members.

12. A device according to claim 11 wherein R and L represent the resistance and length respectively of the n detecting members, and resistance and length of the compensating member being equal to R/n and L/n, respectively.

13. A device for reading information magnetically coded on a carrier having precoded information and adapted to be passed successively in front of a magnetizing device for magnetizing the information and a magnetic transducer device for detecting the magnetized information, comprising:

a magnetizing device having at least one magnetic layer said magnetic layer containing a succession of adjoining zones of lengths $d_1$ and $d_2$, the length $d_2$ being much greater than $d_1$ and the magnetic inductions in the zones being of opposite sense;

a magnetic transducer device having at least one magneto-resistive member of anisotropic magnetic material for detecting the information and a magneto-resistive compensating member of anisotropic material, said compensating member being disposed close to the magneto-resistive detecting member at a distance such that it is subject to the same interference fields as the detecting member while not being subject to the magnetic leakage field of the magnetized information as it passes in front of the transducer, the voltages developed across the detecting and compensating members in response to the effect of the interference fields being substantially equal, and said magnetizing device being disposed on the same insulating substrate as the magnetic transducer and being arranged such that its edge closest to the said magneto-resistive members is at a distance of δ from the latter such that its leakage field Hpol polarizes the magneto-resistive members by causing their axes of easy magnetization to rotate through an angle $\theta$ of between 0 and 90°.

14. A device according to claim 13 wherein the magnetic layer has a high coercive field.

15. A device according to claim 13 wherein the magnetic induction in the shorter zones is positive and is equal to the residual induction of the magnetic layer.

16. A device according to claim 13 wherein the magnetic induction in the longer zones is negative and equal to the residual induction of the magnetic layer.

17. A device according to claim 13 wherein the detecting and compensating members have the same coefficient of magneto-resistance.

* * * * *